US006852944B2

(12) United States Patent
MacKenzie et al.

(10) Patent No.: US 6,852,944 B2
(45) Date of Patent: Feb. 8, 2005

(54) RETRACTABLE ELECTRODE COOLANT TUBE

(75) Inventors: Darrin H. MacKenzie, Windsor, VT (US); Christopher J. Conway, Wilmot, NH (US); Mark Gugliotta, Concord, NH (US); Kevin J. Kinerson, Corinth, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 45 days.

(21) Appl. No.: 10/409,636

(22) Filed: Apr. 7, 2003

(65) Prior Publication Data

US 2004/0200809 A1 Oct. 14, 2004

(51) Int. Cl.[7] .................................................. B23K 9/00
(52) U.S. Cl. ................................ 219/121.49; 219/121.5
(58) Field of Search .............................. 219/121.48, 75, 219/121.49, 62, 121.5; 313/231.31

(56) References Cited

U.S. PATENT DOCUMENTS 4,580,032 A * 4/1986 Carkhuff ...................... 219/75
4,691,094 A * 9/1987 Hatch et al. ........... 219/121.48
4,940,877 A * 7/1990 Broberg ................... 219/121.5
4,973,816 A * 11/1990 Haberman ............. 219/121.48
5,756,959 A * 5/1998 Freeman et al. ....... 219/121.49
5,874,707 A * 2/1999 Iida et al. .............. 219/121.48
5,906,758 A * 5/1999 Severance, Jr. .......... 219/121.5

* cited by examiner

*Primary Examiner*—Teresa J. Walberg
(74) *Attorney, Agent, or Firm*—Harness, Dickey & Pierce, P.L.C.

(57) ABSTRACT

Plasma arc torches are provided that include a mounting for an electrode and a coolant tube telescopingly mounted on the plasma arc torch to engage and deliver coolant to electrodes of different sizes mounted in the mounting. The telescopingly mounted coolant tube may extend to a closed position in which coolant does not flow when no electrode is mounted in the mounting. The telescopingly mounted coolant tube may further be used to electrically connect a cathodic member with the electrode mounted in the mounting.

42 Claims, 5 Drawing Sheets

RETRACTABLE ELECTRODE COOLANT TUBE

FIELD

The present invention relates generally to plasma arc torches and more particularly to devices and methods for installing and delivering coolant to electrodes in plasma arc torches.

BACKGROUND

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch.

In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a “transferred arc” mode.

Plasma arc torches often operate at high current levels and high temperatures. Accordingly, torch components and consumables must be properly cooled in order to prevent damage or malfunction and to increase the operating life and cutting accuracy of the plasma arc torch. To provide such cooling, high current plasma arc torches are generally water cooled, although additional cooling fluids may be employed, wherein coolant supply and return tubes are provided to cycle the flow of cooling fluid through the torch.

Several plasma arc torches cool electrodes by delivering a flow of coolant to an internal surface of the electrode. Because the shape and size of the coolant flow path to the electrode can significantly affect (i.e., increase or decrease) electrode operating life, it is not uncommon for coolant flow paths to be advantageously shaped and sized for a particular electrode size in order to maximize, or at least increase, electrode operating life.

Some plasma arc torches are adapted to house a variety of electrodes of different sizes for cutting various materials at different amperages. Because the different electrode sizes change the characteristics of the coolant flow path, the coolant flow path in these torches is not optimized for any one electrode size. Instead, the design of the coolant flow path is a compromise of performance for the various electrode sizes.

Accordingly, the inventors have a recognized a need for devices and methods that allow electrodes of different sizes to be installed in a plasma arc torch with a same coolant flow path being maintained regardless of which of the differently sized electrodes is installed on the torch.

Additionally, an unwanted flow of coolant commonly occurs when components are not installed on the plasma arc torch such as during component replacement. Accordingly, the inventors have recognized a further need for devices and methods for preventing the flow of coolant when no electrode is in installed on the plasma arc torch.

SUMMARY

In order to solve these and other needs in the art, the inventors hereof have succeeded in designing plasma arc torches that include a mounting for an electrode and a telescopingly mounted coolant tube telescopingly to engage and deliver coolant to an electrode mounted in the mounting. In certain embodiments of the invention, the telescopingly mounted coolant tube extends to a closed position in which coolant does not flow when no electrode is mounted in the mounting. The telescopingly mounted coolant tube may further be used to electrically connect a cathodic member with the electrode mounted in the mounting.

Further areas of applicability of the present invention will become apparent from the detailed description provided hereinafter. It should be understood that the detailed description and specific examples, while indicating at least one exemplary embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EXEMPLARY EMBODIMENTS

Figure 1B:
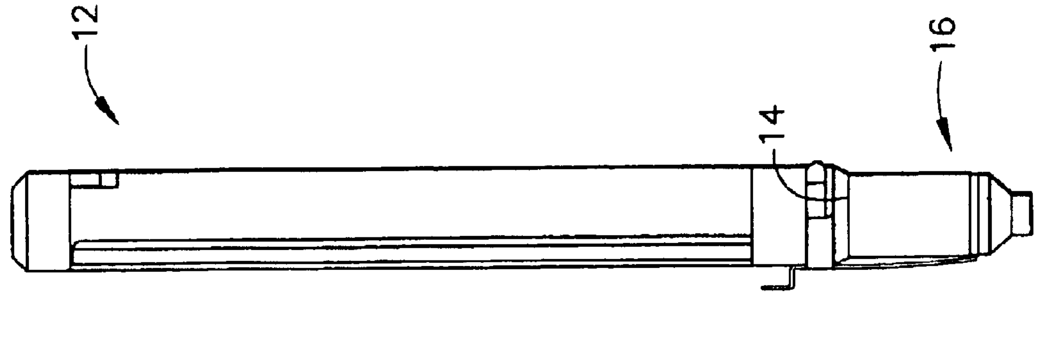
FIG. 1B is a view illustrating an automated or mechanized plasma arc torch according to another embodiment of the invention.
Figure 1A:
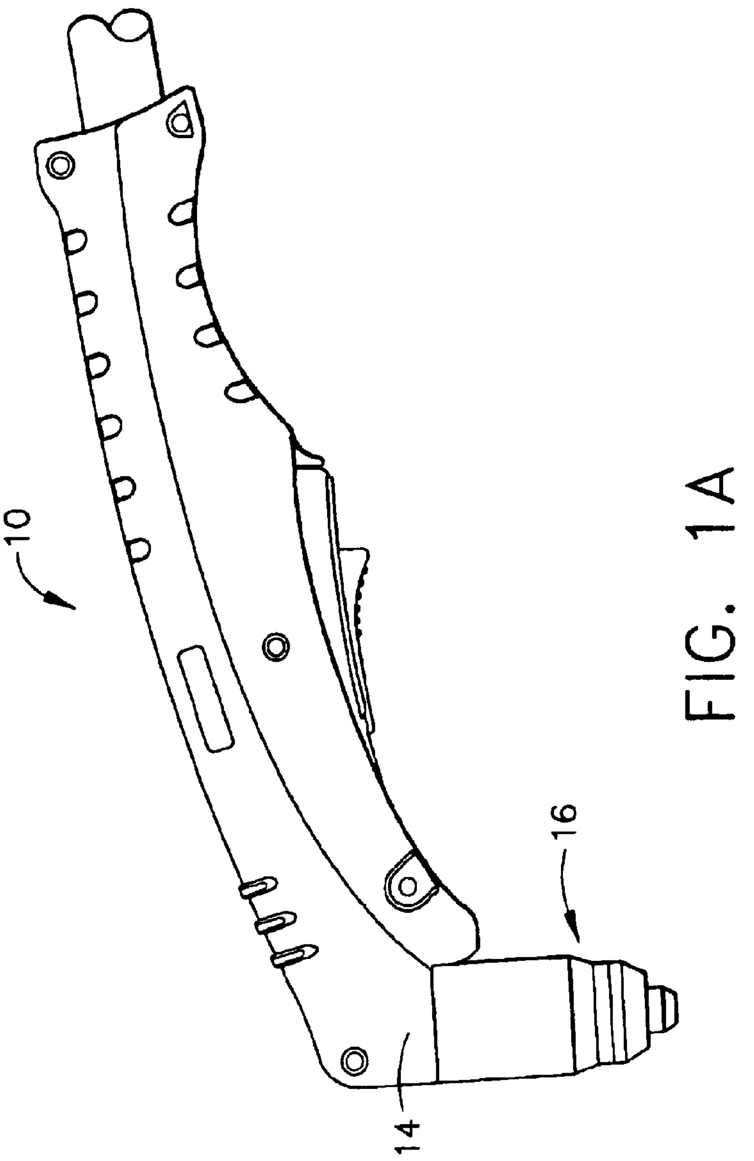
FIG. 1A is a view illustrating a manually operated plasma arc torch according to one embodiment of the invention.

Referring to the drawings, exemplary embodiments of the invention include a manually operated plasma arc torch 10 and a mechanized, or automated, plasma arc torch 12, which are respectively illustrated in FIGS. 1A and 1B. As shown, each torch 10 and 12 includes a plasma arc torch head 14 having a distal end portion 16.

Figure 3:
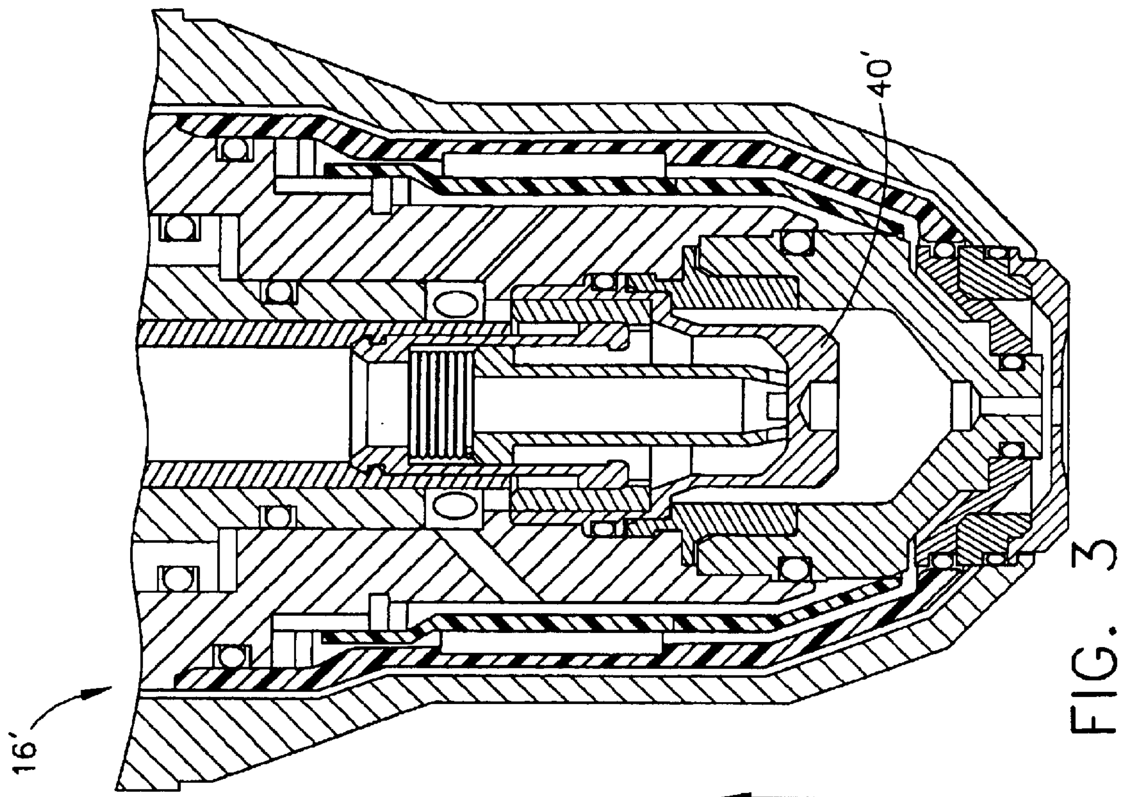
FIG. 3 is a longitudinal cross-sectional view of the distal end portion of the plasma arc torch head of FIG. 2 with a shorter electrode.
Figure 2:
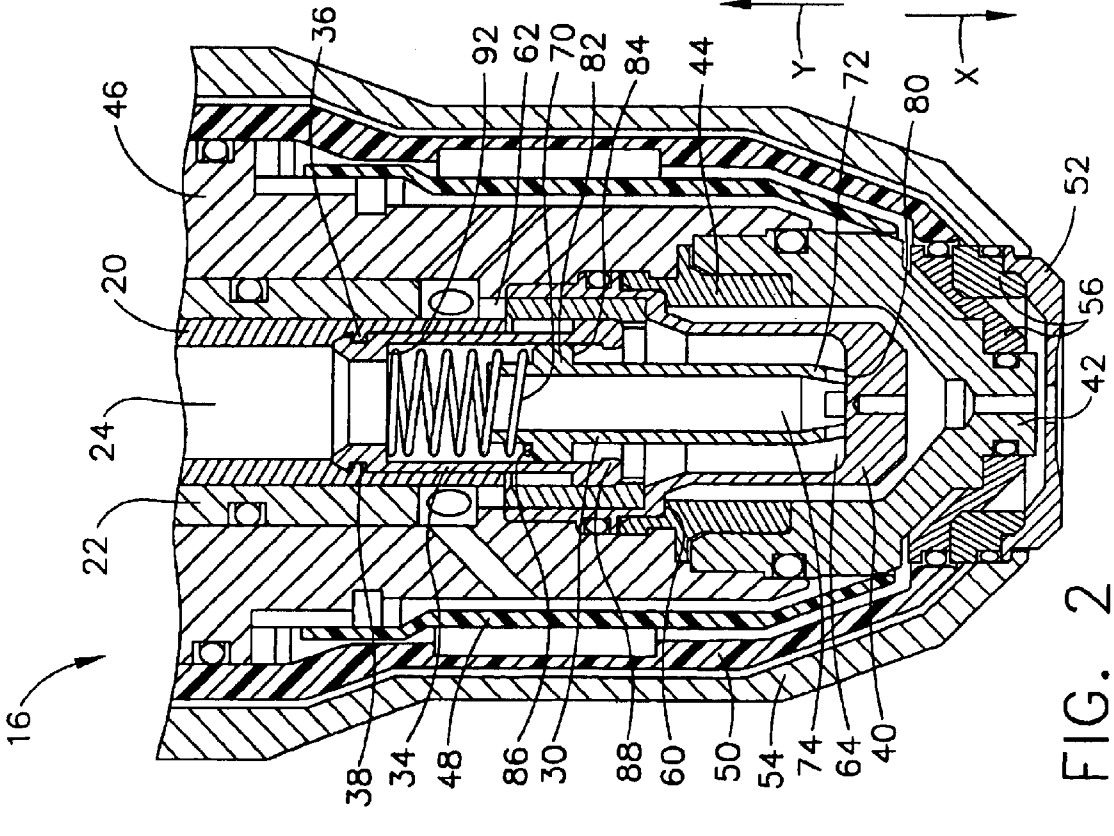
FIG. 2 is a longitudinal cross-sectional view of a distal end portion of a plasma arc torch head according to one embodiment of the invention.

FIGS. 2 and 3 illustrate various components secured to the plasma arc torch head 14 and disposed at its distal end portion 16. Generally, the plasma arc torch head 14 includes a cathode 20 that is in electrical communication with the negative side of a power supply (not shown). The cathode 20 is surrounded by a central insulator 22 to insulate the cathode 20 from an anode body (not shown) that is in electrical communication with the positive side of the power supply.

The cathode 20 defines an inner conduit 24 having a proximal end portion in fluid communication with an coolant supply via a coolant supply tube (not shown). The inner conduit 24 also includes a distal end portion in fluid communication with a coolant tube 30 and a sleeve 34. The cathode 20 further comprises an internal annular ring 36 that engages a groove 38 formed in the sleeve 34 to secure the sleeve 34 within the cathode 20.

As used herein, the terms distal direction or distally should be construed to be the direction indicated by arrow X, and the terms proximal direction or proximally should be construed to be the direction indicated by arrow Y.

The consumable components of the plasma arc torch head 14 generally comprise an electrode (e.g. 40 (FIG. 2), 40' (FIG. 3)), a tip 42, a spacer 44, a central body 46, an anode shield 48, a baffle 50, a secondary orifice 52, a shield cap 54, and shield cap spacers 56.

The mounting for the electrode 40 is defined by portions of the electrode 40 and one or more other consumable components. In the particular illustrated embodiment, the electrode mounting comprises an external shoulder 60 on the electrode 40 that abuts the spacer 44, and an internal annular ring 62 formed on the central body 46 that abuts a proximal end of the electrode 40.

When mounted in the mounting, the electrode 40 is centrally disposed within the central body 46, with a central cavity 64 of the electrode 40 in fluidic communication with the coolant tube 30. The electrode 40 is also in electrical communication with the cathode 20, in a manner described in greater detail below.

The central body 46 surrounds both the electrode 40 and the central insulator 22. The central body 46 separates the anode shield 48 from the electrode 40 and the tip 42. In one embodiment, the central body 46 is an electrically insulative material such as PEEK®, although other electrically insulative materials can also be used.

The coolant tube 30 will now be described in more detail. The coolant tube 30 includes at least one inlet 70 for receiving a coolant into the tube 30. The coolant tube 30 further includes a crenulated distal end portion 72 for discharging coolant from the tube 30 and an axial fluid passage 74 extending from the inlet 70 to the crenulated distal end portion 72.

Figure 4:
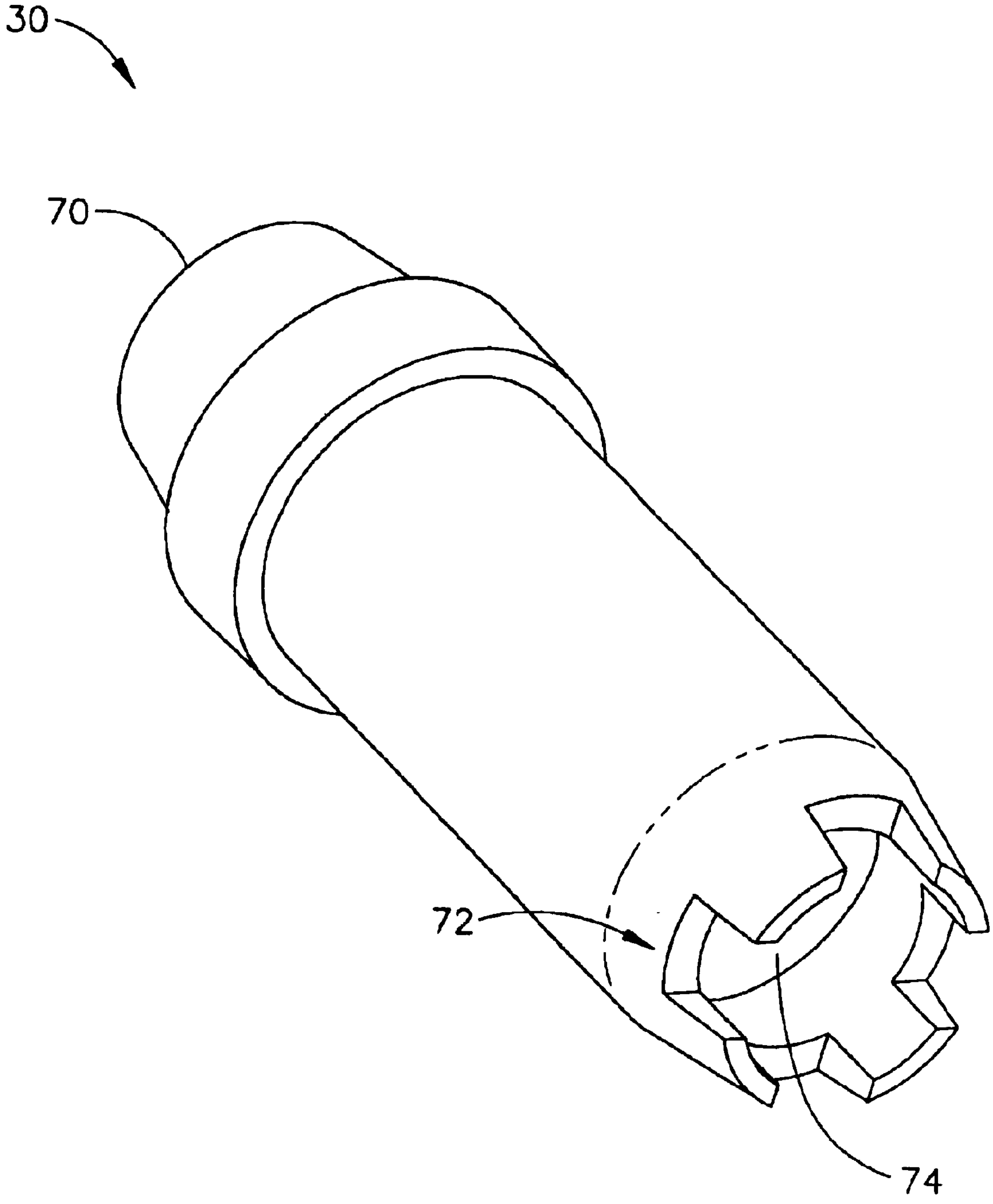
FIG. 4 is a perspective view of the coolant tube shown in FIGS. 2 and 3.

In the particular illustrated embodiment of FIG. 4, the coolant tube 30 is provided with a single axially-oriented inlet 70 at about the center of the proximal end of the coolant tube 30. Alternatively, the coolant tube can be provided with other quantities of inlets in other orientations and at other locations. For example, the coolant tube 130 shown in FIGS. 5 through 7 includes radially extending inlets defined through a sidewall of the coolant tube. Or for example, the coolant tube 230 shown in FIGS. 8 through 10 includes a crenulated proximal end portion 270 for allowing a coolant into the coolant tube 230.

With further reference to FIGS. 2 and 3, the coolant tube 30 is telescopingly mounted on the plasma arc torch head 14. This allows the coolant tube 30 to extend and retract accordingly to engage electrodes of different lengths, such as the electrode 40 (FIG. 2) and the shorter electrode 40' (FIG. 3).

The telescoping mounting arrangement also allows the coolant tube 30 to maintain the relative positioning of (e.g., physical contact between) its crenulated distal end portion 72 to an internal surface 80 of any one of a plurality of differently sized electrodes. Accordingly, embodiments of the present invention allow electrodes of different sizes to be installed in a plasma arc torch with a substantially similar coolant flow path being maintained regardless of which of the differently sized electrodes is installed on the torch. This, in turn, allows the coolant flow path to be advantageously sized and shaped for more than just a single electrode size.

In the illustrated embodiment, the coolant tube 30 is sized to be slidably received within the sleeve 34. The coolant tube 30 includes an external annular ring 82 defining a distal shoulder 84 and a proximal shoulder 86. The distal shoulder 84 is positioned to abut against an internal shoulder 88 of the sleeve 34 to form a stop. The stop inhibits distal movement of the coolant tube 30 beyond an extended position such that the coolant tube 30 remains in the plasma arc torch head 14 when no electrode is installed on the torch.

A wide range of devices and methods may be used to distally bias the coolant tube, including coil springs, fluid (e.g., gas or liquid) pressure, gravity, among other biasing means. In the particular illustrated embodiment, the plasma arc torch head 14 includes a coil spring 90 positioned within the sleeve 34 between an internal shoulder 92 of the sleeve 34 and the proximal shoulder 86 of the coolant tube 30.

The coil spring 90 resiliently biases the coolant tube 30 and causes the crenulated distal end portion 72 of the tube 30 to contact and remain in contact with the portion 80 of the electrode 40 both during and after electrode installation. The electrode portion 80 preferably coincides with a critical heat area of the electrode 40.

The spring biasing force helps maintain a constant coolant flow path from the coolant tube 30 to the electrode portion 80 during operation of the torch. Additionally, or alternatively, the coil spring 90 may bias the coolant tube 30 into direct physical contact with one or more other components, which are, in turn, in direct physical contact with the electrode.

To install the electrode 40 on the torch head 14, a proximally directed force of sufficient magnitude must be applied to overcome the biasing force applied by the coil spring 90. Once overcome, the electrode 40 and the coolant tube 30 move proximally together which maintains the relative positioning of the electrode portion 80 to the crenulated distal end portion 72 from which coolant exits the tube 30.

In some embodiments, a telescopingly mounted coolant tube is also used to electrically connect the electrode with the cathode. In such embodiments, the coolant tube and sleeve are each formed from an electrically conductive material. The electrical connection between the electrode and the cathode is established through the contact of the electrode with the distal end portion of the coolant tube, the contact of the coolant tube with the sleeve, and the contact of the sleeve with the cathode.

Additionally, the coil spring may also be formed from an electrically conductive material. And, the electrical connection between the electrode and the cathode may be made via the contact of the electrode with the distal end portion of the coolant tube, the contact of the coolant tube with the spring, the contact of the spring with the sleeve, and the contact of the sleeve with the cathode.

Figure 7:
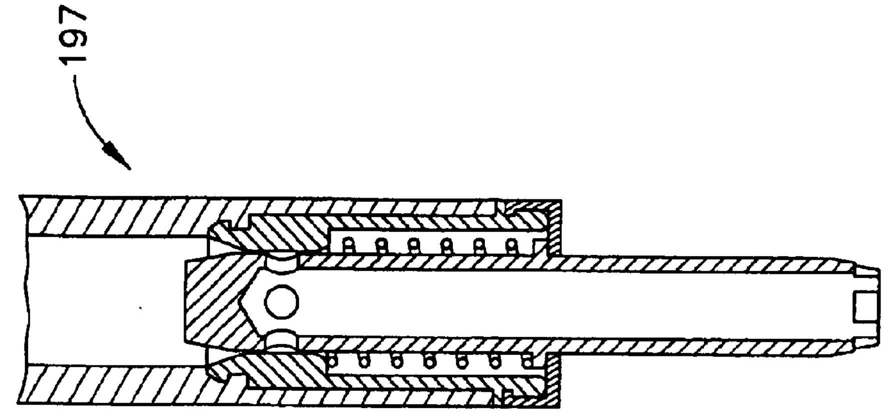
FIG. 7 is a longitudinal cross-sectional view of the components of FIG. 5 without an electrode.
Figure 6:
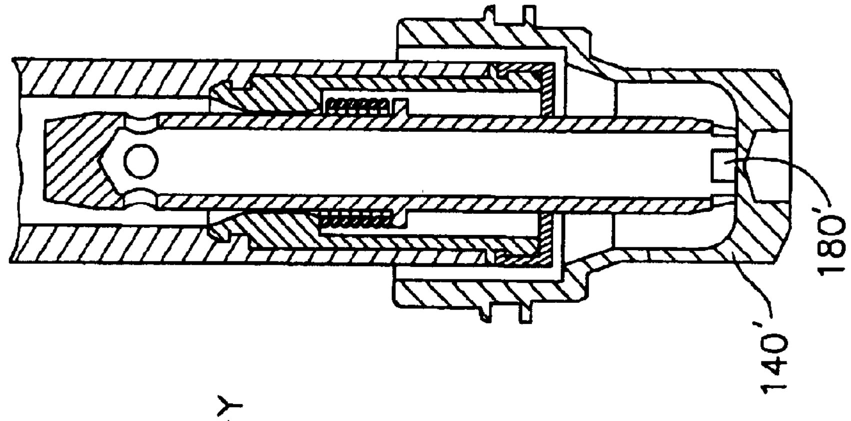
FIG. 6 is a longitudinal cross-sectional view of the components of FIG. 5 with a shorter electrode.
Figure 5:
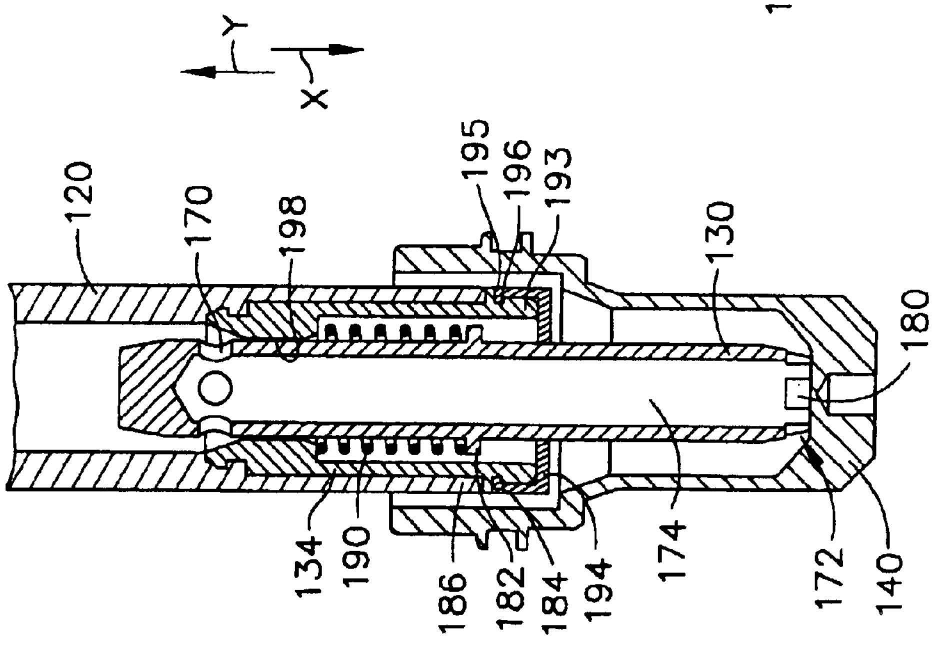
FIG. 5 is a longitudinal cross-sectional view of various components including a telescopingly mounted coolant tube according to another embodiment of the invention.

Referring now to FIGS. 5 through 7, another form of the invention is illustrated in which the flow of coolant through the telescopingly mounted coolant tube 130 is occluded or blocked when no electrode is mounted in the mounting.

As shown, the coolant tube 130 includes inlets 170 radially extending through the coolant tube sidewall. The coolant tube 130 further includes a crenulated distal end portion 172 for discharging coolant from the tube 130, and an axial fluid passage 174 extending from the fluid inlets 170 to the crenulated distal end portion 172.

The coolant tube 130 is sized to be slidably received within a sleeve 134. The coolant tube 130 includes an external annular ring 182 defining a distal shoulder 184 and a proximal shoulder 186. The distal shoulder 184 is positioned to abut against an internal shoulder 193 of a retaining cap 194, and thus forms a stop. As shown in FIG. 7, the stop inhibits distal movement of the coolant tube 130 beyond an extended position such that the coolant tube 130 remains in the plasma arc torch head and doesn't fall out when no electrode is installed on the torch.

To secure the retaining cap 194 to the sleeve 134, the retaining cap 194 is threadedly engageable with the sleeve 134. This allows the retaining cap 194 to be readily engaged and disengaged from the sleeve 134, which, in turn, allows the coolant tube 130 and the spring 190 to be readily removed and replaced.

In the illustrated embodiment, the retaining cap 194 includes a ring 195 that threadedly engages a external groove 196 formed in the sleeve 134 to removably secure the retaining cap 194 to the sleeve 134. Alternatively, the retaining cap may include a ring that is threadedly engageable with an internal groove formed within the sleeve. In other embodiments, the sleeve may be provided with a ring that is threadedly engageable with one or more grooves defined by the retaining cap.

The coolant tube 130 is distally biased to extend to a closed or no flow position 197 (FIG. 7) when no electrode is installed on the torch. In the closed portion, the inlets 170 of the coolant tube 130 are covered by an inner surface portion 198 of the sleeve 134, which prevents fluid flow through the tube 130.

A wide range of devices and methods may be used to distally bias the coolant tube, including coil springs, fluid (e.g., gas or liquid) pressure, gravity, among other biasing means. In the particular illustrated embodiment, a coil spring 190 is positioned within the sleeve 134 between an internal shoulder 192 of the sleeve 134 and the proximal shoulder 186 of the coolant tube 130.

The spring biasing force causes the crenulated distal end portion 172 of the coolant tube 130 to contact and remain in contact with the internal surface or portion 180 of the electrode 140 both during and after electrode installation. The electrode portion 180 preferably coincides with a critical heat area of the electrode 140. The spring biasing force helps maintain a constant coolant flow path from the coolant tube 130 to the electrode portion 180 during operation of the torch.

Electrode installation requires application of a sufficient force to overcome the biasing force of the coil spring 190. After that point, the electrode 140 and the coolant tube 130, being in direct physical contact with one another, move proximally together which uncovers the fluid inlets 170 of the coolant tube 130. The joint motion of the electrode 140 and coolant tube 130 also maintains the relative positioning of the electrode portion 180 of the electrode 140 to the crenulated distal end portion 172 from which coolant exits the tube 130.

Optionally, the coolant tube 130, sleeve 134, and/or coil spring 190 can be used to electrically connect electrodes of different lengths with the cathode 120 in a manner similar to that described above.

Figure 10:
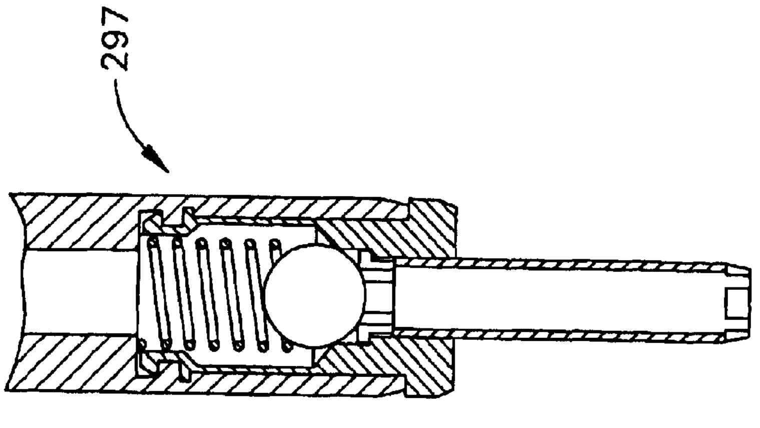
FIG. 10 is a longitudinal cross-sectional view of the components of FIG. 8 without an electrode.
Figure 9:
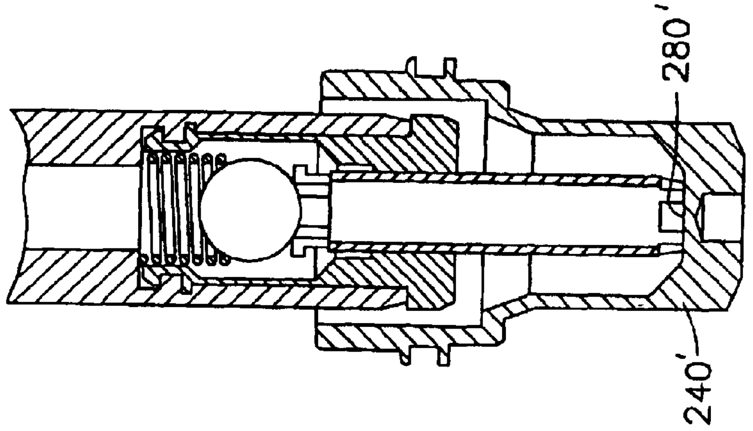
FIG. 9 is a longitudinal cross-sectional view of the components of FIG. 8 with a shorter electrode.
Figure 8:
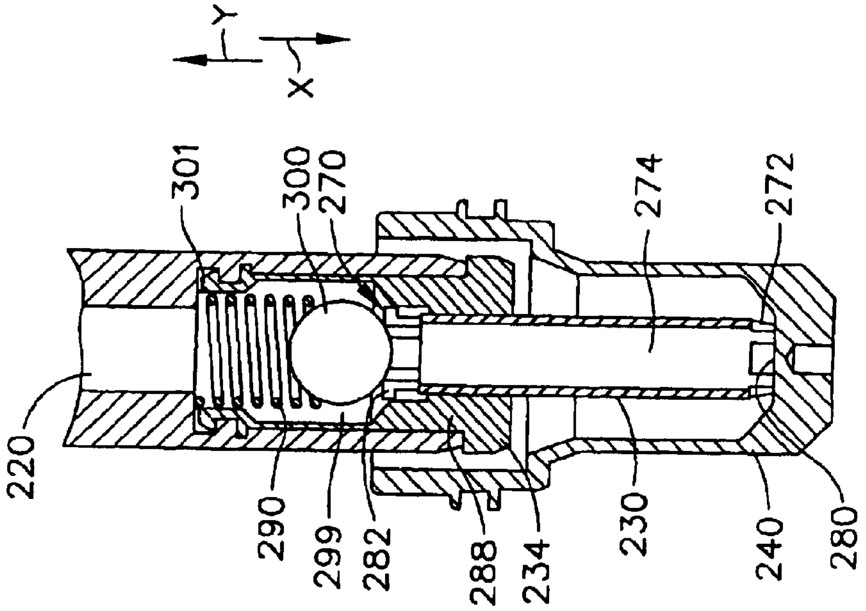
FIG. 8 is a longitudinal cross-sectional view of various components including a telescopingly mounted coolant tube according to another embodiment of the invention.

FIGS. 8 through 10 illustrate another embodiment of the invention in which the flow of coolant through a telescopingly mounted coolant tube 230 is occluded or blocked when no electrode is installed.

As shown, the coolant tube 230 includes a crenulated proximal end portion 270 for receiving a coolant into the tube 230, and a crenulated distal end portion 272 for discharging coolant from the tube 230. The coolant tube 230 also includes an axial fluid passage 274 extending between the crenulated proximal and distal end portions 270 and 272.

The coolant tube 230 is sized to be slidably received within a sleeve 234, with the crenulated proximal end portion 270 of the tube 230 in fluid communication with an opening 299 in the sleeve 234. The proximal end of the coolant tube 230 includes an external distal shoulder 282 positioned to abut against an internal shoulder 288 of the sleeve 234, thus forming a stop. The stop inhibits distal movement of the coolant tube 230 beyond an extended position, which thus ensures that the coolant tube 230 remains in the plasma arc torch head and doesn't fall out when no electrode is installed on the torch.

The coolant tube 230 is distally biased to extend to a closed or no flow position 297 (FIG. 10) when no electrode is installed on the torch. In the closed position, a ball 300 blocks the sleeve opening 299 to occlude fluid flow into the crenulated proximal end portion 270 of the coolant tube 230. To help ensure that the ball 300 fluidically seals the sleeve opening 299, the ball 300 and/or the sleeve opening 299 is preferably formed of a readily deformable material.

Alternatively, other components (e.g., non-spherically shaped components, etc.) can take the place of the ball 300 to block the sleeve opening 299 when the coolant tube 230 is in the closed position 297. For example, the proximal end of the coolant tube in another embodiment is adapted (e.g., shaped and sized) to block the sleeve opening when the coolant tube is in the closed position.

A wide range of devices and methods may be used to distally bias the coolant tube, including coil springs, fluid pressure, gravity, among other biasing means. In the particular illustrated embodiment, a coil spring 290 is positioned within the sleeve 234 between an internal shoulder 301 of the cathode 220 and the ball 300, which is shown in contact with the proximal end of the coolant tube 230.

The spring biasing force causes the crenulated distal end portion 270 of the tube 230 to contact and remain in contact with an internal surface or portion 280 of the electrode 240 both during and after electrode installation. The electrode portion 280 preferably coincides with a critical heat area of the electrode 240. The spring biasing force helps maintain a constant coolant flow path from the coolant tube 230 to the electrode portion 280 during operation of the torch.

Accordingly, electrode installation requires application of a sufficient force to overcome the biasing force of the coil spring 290. After that point, the electrode 240 and the coolant tube 230 move proximally together, and the coolant tube 230 moves the ball 300 proximally away from the sleeve opening 299. This allows coolant to flow through the sleeve opening 299 into the crenulated proximal end portion 270 of the tube 230. In addition, the joint motion of the coolant tube 230 and the electrode 240 maintains the relative positioning of the crenulated distal end portion 272 from which coolant exits the tube 230 to the electrode surface or portion 280.

Optionally, the coolant tube 230, sleeve 234, and/or coil spring 290 can be used to electrically connect electrodes of different lengths with the cathode 220 in a manner similar to that described above.

Other embodiments of the invention provide a plasma arc torch that includes a cathodic member within the plasma arc torch, an electrode removably mounted on the plasma arc torch, and a telescopingly mounted member. The telescopingly mounted member is resiliently biased to extend to contact the electrode to electrically connect the electrode with the cathodic member. In the illustrated embodiments, the telescopingly mounted member is a coolant tube although it is anticipated that other embodiments will include a wide range of other telescopingly mounted components.

Yet other embodiments of the invention provide a plasma arc torch that includes a cathodic member within the plasma arc torch, a mounting for an electrode, and a member telescopingly mounted in the plasma arc torch to electrically connect electrodes of different sizes mounted in the mounting with the cathodic member. In the illustrated embodiments, the telescopingly mounted member is a coolant tube although it is anticipated that other embodiments will include a wide range of other torch telescopingly mounted components.

Further embodiments of the invention provide a plasma arc torch that includes a mounting for a torch component and a coolant tube telescopingly mounted to contact the torch component mounted in the mounting. In the illustrated embodiments, the torch component is an electrode although it is anticipated that other embodiments will be applicable to a wide range of other torch components.

Additional embodiments provide a plasma arc torch that includes a telescoping coolant tube and at least one other torch component. The coolant tube is biased to telescope to contact the other torch component when the other torch component is installed on the plasma arc torch. In the illustrated embodiments, the other torch component is an electrode although it is anticipated that other embodiments will be applicable to a wide range of other torch components.

In another form, the present invention provides methods for electrically connecting a cathodic member and an electrode in a plasma arc torch. In one embodiment, the method generally comprises telescopingly mounting a member on the plasma arc torch to extend to contact the electrode mounted on the plasma arc torch to electrically connect the electrode with a cathodic member. Additionally, the method may also include distally biasing the telescopingly mounted member to remain in contact with the electrode during operation of the torch. In the illustrated embodiments, the telescopingly mounted member is a coolant tube although it is anticipated that other embodiments will include a wide range of other torch telescopingly mounted components.

In yet another form, the present invention provides methods for accommodating electrodes of different sizes in a plasma arc torch. In one embodiment, the method generally comprises telescopingly mounting a coolant tube on the plasma arc torch to allow the coolant tube to engage and deliver coolant through the tube to any one of the electrodes of different sizes mounted on the plasma arc torch. Additionally, the method may include distally biasing the coolant tube with a biasing device and/or occluding fluid flow through the coolant tube when no electrode is installed on the plasma arc torch.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A plasma arc torch comprising:

a mounting for an electrode; and a coolant tube telescopingly mounted on the plasma arc torch to deliver coolant to an electrode mounted in the mounting, wherein the coolant tube extends to a closed position preventing coolant from being delivered through the tube when no electrode is mounted in the mounting.

2. The plasma arc torch of claim 1, wherein the coolant tube is generally hollow and positioned to extend at least partially into a generally hollow electrode mounted in the mounting.

3. The plasma arc torch of claim 1, wherein the coolant tube electrically connects an electrode mounted in the mounting with a cathodic member in the plasma arc torch.

4. The plasma arc torch of claim 1, further comprising a biasing device for resiliently biasing the coolant tube in a distal direction.

5. The plasma arc torch of claim 4, wherein the biasing device comprises a coil spring engaged with a shoulder defined by the coolant tube.

6. The plasma arc torch of claim 1, further comprising means for resiliently biasing the coolant tube in a distal direction.

7. The plasma arc torch of claim 1, further comprising a stop for inhibiting distal movement of the coolant tube beyond an extended position when no electrode is mounted in the mounting.

8. The plasma arc torch of claim 7, wherein:

the plasma arc torch further comprises a retaining cap; and the stop comprises a shoulder defined by the coolant tube and positioned to engage a shoulder defined by the retaining cap.

9. The plasma arc torch of claim 8, wherein the retaining cap is threadedly engaged to another torch component.

10. The plasma arc torch of claim 9, wherein the another torch component comprises a sleeve disposed at least partially around the coolant tube.

11. The plasma arc torch of claim 7, wherein:

the plasma arc torch further comprises a sleeve disposed at least partially around the coolant tube; and the stop comprises a shoulder defined by the coolant tube and positioned to engage a shoulder defined by the sleeve.

12. The plasma arc torch of claim 1, further comprising a fluid occluding device for occluding fluid flow through the coolant tube when no electrode is mounted in the mounting.

13. The plasma arc torch of claim 1, further comprising means for occluding fluid flow through the coolant tube when no electrode is mounted in the mounting.

14. The plasma arc torch of claim 1, wherein:

the coolant tube comprises an inlet, an outlet, and a passage extending from the inlet to the outlet; and a surface of another torch component covers the inlet when no electrode is mounted in the mounting.

15. The plasma arc torch of claim 1, wherein the coolant tube is removably engaged with the plasma arc torch.

16. A plasma arc torch comprising:

a mounting for an electrode: and a coolant tube telescopingly mounted on the plasma arc torch to deliver coolant to an electrode mounted in the mounting, wherein the plasma arc torch is adapted to maintain a position of a distal end portion of the coolant tube relative to an internal surface portion of any one of a plurality of electrodes of different sizes mounted in the mounting.

17. A plasma arc torch comprising:

a mounting for an electrode: and a coolant tube telescopingly mounted on the plasma arc torch to deliver coolant to an electrode mounted in the mounting, wherein the plasma arc torch is adapted to maintain physical contact between a distal end portion of the coolant tube and an internal surface portion of any one of a plurality of electrodes of different sizes mounted in the mounting.

18. A plasma arc torch comprising:

a mounting for an electrode; and a coolant tube telescopingly mounted on the plasma arc torch to deliver coolant to an electrode mounted in the mounting; and a biasing device for resiliently biasing the coolant tube in a distal direction, wherein the plasma arc torch is adapted to maintain physical contact between a distal end portion of the coolant tube and an internal surface portion of any one of a plurality of electrodes of different sizes mounted in the mounting.

19. A plasma arc torch comprising:

a mounting for an electrode:

a coolant tube telescopingly mounted on the plasma arc torch to deliver coolant to an electrode mounted in the mounting;

the coolant tube comprises an inlet, an outlet, and a passage extending from the inlet to the outlet; and a surface of another torch component covers the inlet when no electrode is mounted in the mounting, wherein the another torch component comprises a sleeve disposed at least partially around the coolant tube such that a portion of the sleeve covers the inlet of the coolant tube when no electrode is mounted in the mounting.

20. A plasma arc torch comprising:

a mounting for an electrode;

a coolant tube telescopingly mounted on the plasma arc torch to deliver coolant to an electrode mounted in the mounting; and a sleeve disposed at least partially around the coolant tube, the sleeve including an opening in fluid communication with a inlet of the coolant tube, the opening in the sleeve being blocked to occlude fluid flow into the inlet of the coolant tube when no electrode is mounted in the mounting.

21. A plasma arc torch comprising:

a mounting for an electrode;

a coolant tube telescopingly mounted on the plasma arc torch to deliver coolant to an electrode mounted in the mounting;

a sleeve disposed at least partially around the coolant tube, the sleeve including an opening in fluid communication with a inlet of the coolant tube, the opening in the sleeve being blocked to occlude fluid flow into the inlet of the coolant tube when no electrode is mounted in the mounting;

a biasing device; and a ball disposed between the biasing device and the coolant tube; and the ball blocking the opening in the sleeve to occlude fluid flow into the inlet of the coolant tube when no electrode is mounted in the mounting.

22. A plasma arc torch comprising:

a mounting for an electrode; and a coolant tube telescopingly mounted in the plasma arc torch to engage electrodes of different sizes mounted in the mounting for delivering coolant thereto, and to extend to a closed position in which coolant does not flow when no electrode is mounted in the mounting.

23. A plasma arc torch for use with a removable electrode, the plasma arc torch including a telescoping coolant tube biased to telescope to engage an electrode installed on the plasma arc torch, to deliver coolant through the tube to the electrode installed on the plasma arc torch, and to telescope to a closed position preventing coolant from being delivered through the tube when no electrode is installed on the plasma arc torch.

24. A plasma arc torch comprising:

an electrode removably mounted on the plasma arc torch; and a telescopingly mounted coolant tube resiliently biased to extend to engage an electrode mounted on the plasma arc torch to deliver coolant thereto, and to extend to a no flow position when no electrode is mounted on the plasma arc torch to block coolant flow through the tube.

25. A plasma arc torch comprising:

a telescopingly mounted coolant tube that is resiliently biased to a closed position in which coolant flow through the tube is blocked; and means for mounting an electrode in a position so that the electrode retains the tube from its closed position so that coolant flows through the tube when the electrode is mounted on the plasma arc torch.

26. A plasma arc torch comprising:

a mounting for an electrode;

a cooling passage for the delivery of coolant to an electrode mounted in the mounting; and a coolant tube telescopingly mounted to contact an electrode mounted in the mounting to cause coolant to be delivered to the electrode through the cooling passage and to prevent coolant from being delivered through the passage when the coolant tube does not contact an electrode.

27. A plasma arc torch comprising:

a cathodic member within the plasma arc torch;

an electrode removably mounted on the plasma arc torch; and a telescopingly mounted member resiliently biased to extend to contact the electrode to electrically connect the electrode with the cathodic member.

28. The plasma arc torch of claim 27, wherein the telescopingly mounted member comprises a coolant tube.

29. A plasma arc torch comprising:

a cathodic member within the plasma arc torch;

a mounting for an electrode; and a member telescopingly mounted in the plasma arc torch to electrically connect electrodes of different sizes mounted in the mounting with the cathodic member.

30. The plasma arc torch of claim 29, wherein the member comprises a coolant tube.

31. A coolant tube for delivering coolant to an electrode in a plasma arc torch, the coolant tube comprising:

at least one radial passage for receiving a coolant into the coolant tube;

a crenulated distal end portion for discharging coolant from the coolant tube;

a fluid passage extending from the radial passage to the crenulated distal end portion; and an outer surface defining a proximal shoulder and a distal shoulder, wherein the coolant tube extends to a closed position preventing coolant from being delivered through the tube when no electrode is installed in the plasma arc torch.

32. A coolant tube for delivering coolant to an electrode in a plasma arc torch, the coolant tube comprising:

a crenulated proximal end portion for receiving a coolant into the tube;

a crenulated distal end portion for discharging coolant from the tube; and a fluid passage extending from the crenulated proximal end portion to the crenulated distal end portion, wherein the coolant tube extends to a closed position preventing coolant from being delivered through the tube when no electrode is installed in the plasma arc torch.

33. A plasma arc torch comprising:

a mounting for a torch component; and a coolant tube telescopingly mounted to contact the torch component mounted in the mounting, wherein the coolant tube extends to a closed position preventing coolant from being delivered through the tube when the torch component is not mounted in the mounting.

34. The plasma arc torch of claim 33, wherein the torch component comprises an electrode.

35. A plasma arc torch comprising:

a telescoping coolant tube;

at least one other torch component; and the coolant tube being biased to telescope to contact the other torch, component when the other torch component is installed on the plasma arc torch, wherein the coolant tube extends to a closed position preventing coolant from being delivered through the tube when no electrode is mounted in the mounting.

36. The plasma arc torch of claim 35, wherein the other torch component comprises an electrode.

37. A method of electrically connecting a cathodic member and an electrode in a plasma arc torch, the method comprising telescopingly mounting a member on the plasma arc torch to extend to contact an electrode mounted on the plasma arc torch, the telescopingly mounted member being in electrical communication with the cathodic member.

38. The method of claim 37, wherein the telescopingly mounted member comprises a coolant tube.

39. The method of claim 37, further comprising distally biasing the telescopingly mounted member to remain in contact with the electrode during operation of the plasma arc torch.

40. A method of accommodating electrodes of different sizes in a plasma arc torch, the method comprising telescopingly mounting a coolant tube on the plasma arc torch to engage and deliver coolant through the tube to any one of the electrodes mounted on the plasma arc torch.

41. The method of claim 40, further comprising distally biasing the coolant tube.

42. The method of claim 40, further comprising occluding fluid flow through the coolant tube when no electrode is installed on the plasma arc torch.

* * * * *